United States Patent [19]

Takada et al.

[11] Patent Number: 4,770,545
[45] Date of Patent: Sep. 13, 1988

[54] TEMPERATURE SENSOR

[75] Inventors: Manabu Takada, Yamatokouriyama; Tadao Kanno, Nara; Noboru Ishibashi, Nabari, all of Japan

[73] Assignee: Matsushita Electric Industrial Co., Ltd., Kadoma, Japan

[21] Appl. No.: 41,640

[22] Filed: Apr. 23, 1987

Related U.S. Application Data

[63] Continuation of Ser. No. 739,003, May 29, 1985, abandoned.

[30] Foreign Application Priority Data

Jun. 1, 1984 [JP] Japan ................................ 59-113375

[51] Int. Cl.⁴ ............................................. G01K 1/08
[52] U.S. Cl. ................................... 374/208; 374/163; 374/165; 374/185; 219/450; 136/221
[58] Field of Search ................ 374/163, 208, 179, 185, 374/186, 164, 165; 99/342, 343; 136/217, 220, 221, 230, 229; 219/450

[56] References Cited

U.S. PATENT DOCUMENTS

| | | | |
|---|---|---|---|
| 2,140,479 | 12/1938 | Myers et al. | 219/450 |
| 2,699,487 | 1/1955 | Turner | 219/450 |
| 2,813,962 | 11/1957 | Skala | 219/450 |
| 2,839,594 | 6/1958 | Schneidersmann | 374/208 |
| 2,961,876 | 11/1960 | Wantz | 219/449 |
| 3,072,773 | 1/1963 | Clapp | 219/450 |
| 3,268,844 | 8/1966 | Bergsma | 374/163 |
| 3,474,227 | 10/1969 | Gambill | 219/450 |
| 3,668,372 | 6/1972 | Russell | 219/450 |
| 3,890,588 | 6/1975 | Kanaya et al. | 374/185 |
| 4,241,289 | 12/1980 | Bowling | 136/221 |
| 4,321,827 | 3/1982 | Anderson | 374/165 |
| 4,355,911 | 10/1982 | Tymkewicz | 374/165 |

FOREIGN PATENT DOCUMENTS

| | | | |
|---|---|---|---|
| 2442369 | 6/1975 | Fed. Rep. of Germany | 219/450 |
| 0150180 | 11/1979 | Japan | 136/229 |
| 5589358 | 1/1982 | Japan | 374/185 |

*Primary Examiner*—William A. Cuchlinski, Jr.
*Assistant Examiner*—Thomas B. Will
*Attorney, Agent, or Firm*—Cushman, Darby & Cushman

[57] ABSTRACT

A temperature sensor comprises a temperature sensing element (20) in an inverted cup-shaped casing (17+18), the casing (17+18) is held slidable in vertical direction on a rod-shaped supporting member (23) with a spring (27) therebetween to enforce the cup-shaped casing (17+18) upward, thus relatively moving portions of the casing (17+18) and the supporting member (23) is covered under the inverted cup-shaped casing (17+18), preventing undesirable trouble in the sliding due to contamination by overflowed meal.

9 Claims, 6 Drawing Sheets

TEMPERATURE SENSOR

This is a continuation of application Ser. No. 739,003 filed May 29, 1985 which was abandoned upon the filing hereof.

BACKGROUND OF THE INVENTION

1. Field of the Invention

The present Invention relates to a temperature sensor for use for a heat-cooking apparatus such as a gas cooking stove.

2. Description of the Prior Art

The heat-cooking apparatus for heating and cooking with a pan or the like using heating power such as gas used for cooking food will be described herein.

In such a heat-cooking apparatus, a heating power control means is generally provided for manually controlling an amount of the heating power by, for example, varying amount of combustion gas. Further, such means is known which can maintain a preferable cooking temperature by controlling the heating power with such a feedback system a temperature of an object to be heated (e.g., a pan), and the temperature signal is either supplied to a control apparatus, or stops the combustion when a predetermined critical temperature of the object to be heated is sensed.

In such a heat-cooking apparatus having the temperature control system, a temperature sensor 100 as shown in FIG. 1, for sensing the temperature of the object to be heated is particularly significant. Such conventional temperature sensor 100 comprises a main body 100a and a casing 100b which covers the main body 100a and is disposed at a center of a gas burner, wherein a top surface 100c of the temperature sensor 100 can contact a bottom surface of the cooking pan to directly sense the temperature of the cooking pan when the cooking pan is set on the gas burner.

There is a gap 101 which is exposed against the bottom surface of the cooking pan, between the main body 100a and the casing 100b. Further, the lowest end 100d of the casing 100b is bent in a lateral direction. As a result of such constitution of the temperature sensor 100, an overflow of, for example soup from the cooking pan or dropping of oil or some other cooked material can enter into the inner space of the temperature sensor 100 from the gap 101 or the lowest end 100d of the casing 100b and grows into a hard lump over the course of time. Therefore, the movement of the temperature sensor 100 in the vertical direction will become hindered and difficult to be executed. As a result, the temperature sensor 100 can not sufficiently contact the bottom surface of the cooking pan, and therefore the temperature of the cooking pan can not be sensed precisely. Further, a lateral force caused by the bottom surface of the cooking pan which is apt to be slid in a lateral direction is added to the top surface 100c of the temperature sensor 100, and a force caused by a spring 100e is added in a vertical direction only to an underneath surface of a liquid box 100f, which contains a liquid that swells as the temperature increases, thereby to sense the temperature. Therefore, a moment of a force is produce in an unpreferable direction that makes the temperature sensor 100 inclined.

Accordingly, the temperature sensor 100 does not fully contact the bottom surface of the cooking pan and the correct temperature can not be sensed.

SUMMARY OF THE INVENTION

A purpose of the present invention is to provide an improved temperature sensor for sensing the temperature of the bottom surface of the cooking pan and the like.

A temperature sensor of the present invention comprises:

a thermo-sensitive member comprising a temperature sensitive element, a supporting member for supporting the thermo-sensitive member in a manner to slide in vertical direction thereto, and also within a limited motion in other directions, and a spring member disposed between the thermo-sensitive member and the supporting member, thereby enforcing the thermo-sensitive member upwards.

Furthermore, in an embodiment wherein, the slipping out of a thermo-sensitive member from a supporting member can be prevented.

DESCRIPTION OF THE PREFERRED EMBODIMENT

One embodiment of the heat-cooking apparatus having the temperature sensor of the present invention is disclosed as follows.

Figure 1:
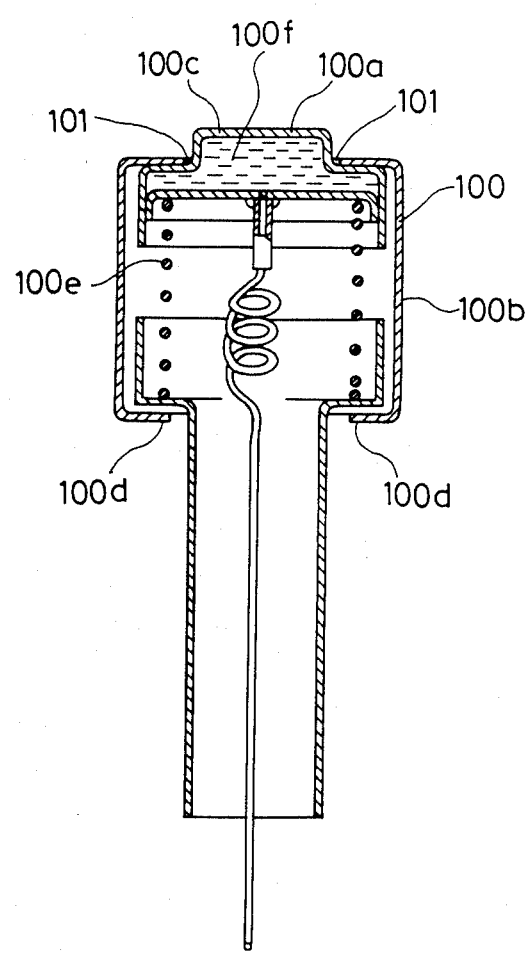
FIG. 1 is a vertical sectional front view of the conventional temperature sensor.
Figure 2:
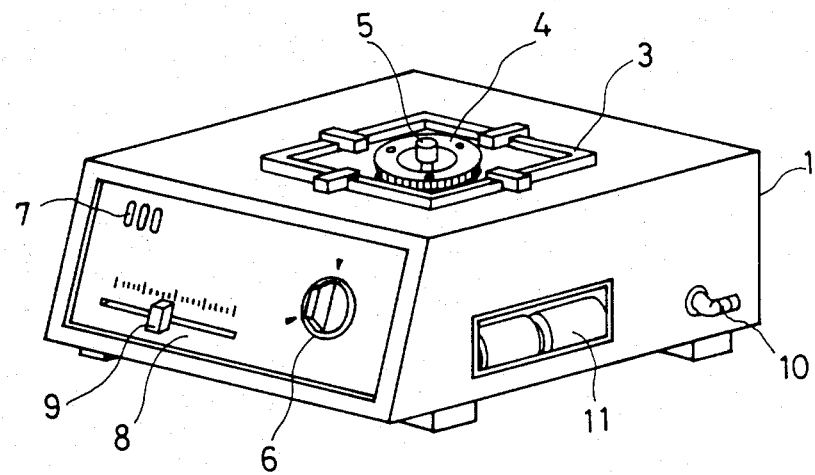
FIG. 2 is a perspective view of a heat-cooking apparatus having the temperature sensor of the present invention.
Figure 3:
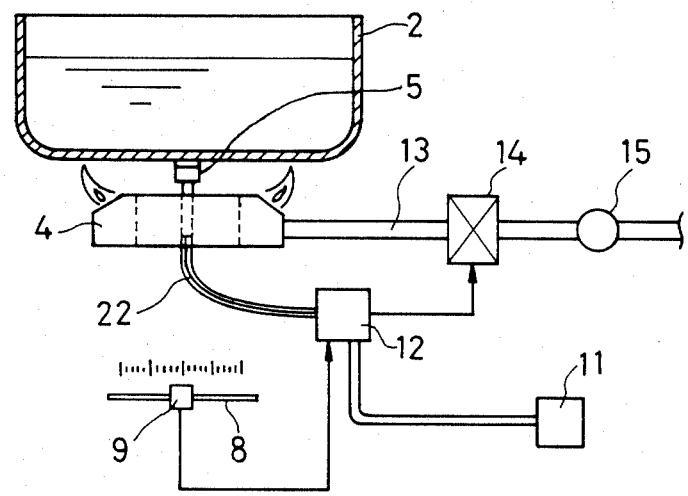
FIG. 3 is a sectional view of the heat-cooking apparatus of the FIG. 2.

This first embodiment shows the present invention applied to a gas cooking stove as shown in FIG. 2 and FIG. 3. A casing 1 of the gas cooking stove comprises a kettle holder 3, which is for holding a cooking pan 2 on its upper surface, and a burner 4. In the center of the burner 4, a temperature sensor 5 of the present invention is provided projecting so as to contact the bottom surface of the cooking pan 2 when the latter is disposed on the kettle holder 3, so that the temperature of the cooking pan 2 is sensed by the temperature sensor. On the front surface of the gas cooking stove casing 1, a knob 6 for igniting the burner 4, an information buzzer 7 for informing an overheated conditions or the right temperatures of cooking and a control knob 9 of a cooking mode setting part 8 for setting a cooking mode are provided. Further, on the side surface of the gas cooking stove casing 1, there are provided a connection part 10 for a fuel gas tube 13 and an electric power source 11 of a dry battery or commercial AC power.

Figure 4:
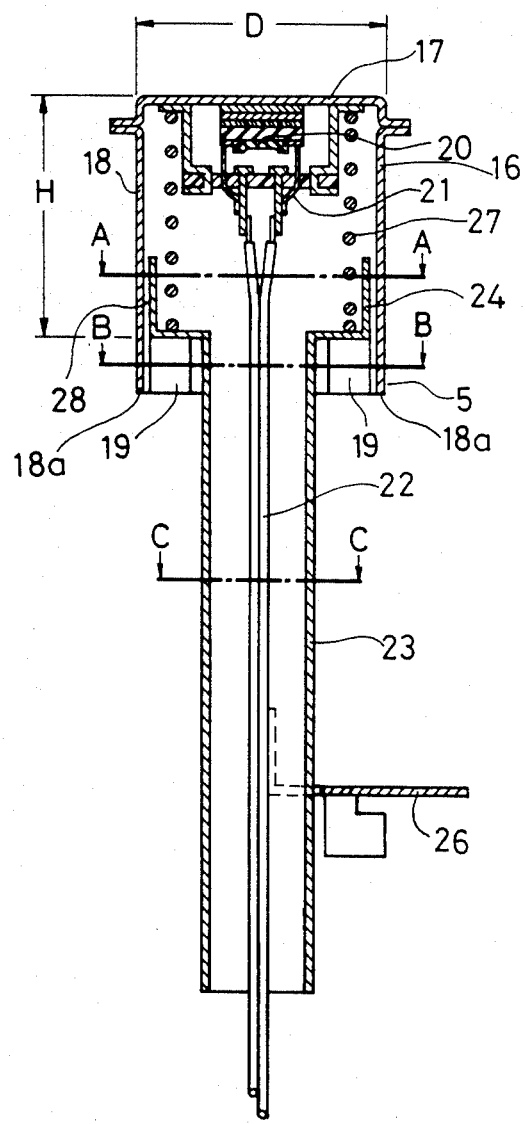
FIG. 4 is a vertical sectional front view of the temperature sensor of the present invention.
Figure 5:
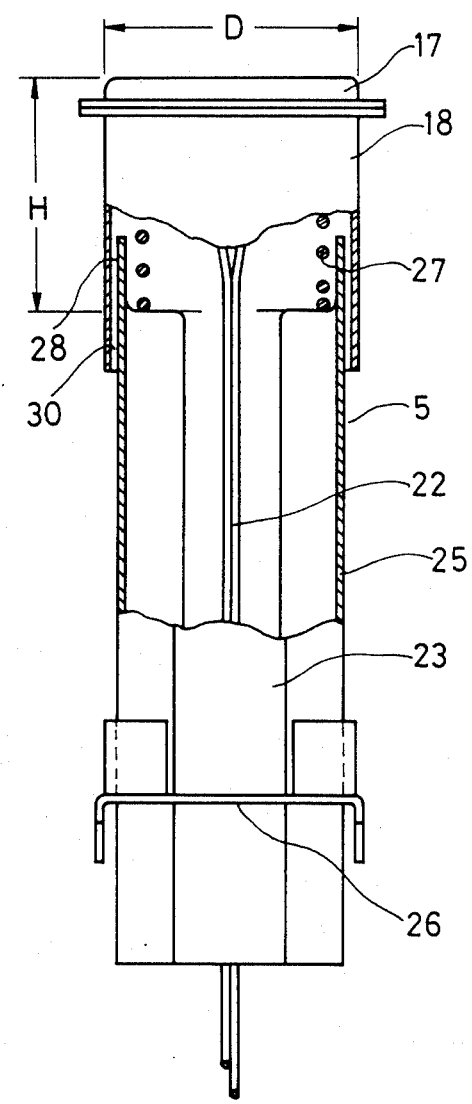
FIG. 5 is a partial vertical sectional side view of the temperature sensor of the present invention.

As shown in FIG. 2, FIG. 3 and FIG. 4, the temperature sensor 5 comprises a thermo-sensitive head 17 capable of contacting the bottom surface of the cooking pan 2 and a temperature sensitive element 20 attached on the lower surface of the thermo-sensitive head 17. The signal issued from the temperature sensitive element 20 is transmitted to a controller 12 through terminals 21 and leading wires 22 as shown in FIG. 3 and FIG. 4. Then, a signal set by the control knob 9 and issued from the cooking mode setting part 8 is transmitted to the controller 12. The controller 12 compares the above-mentioned signals and controls a proportional electromagnetic valve 14 in accordance with the difference amount between the set signal and the sensed signal, and thereby, controls the fuel gas until the signal value issued from the temperature sensitive element 20 becomes equal to a target value of the signal set by the cooking mode setting part 8. The proportional electromagnetic valve 14 is provided at the fuel gas tube 13 connected to the burner 4. Thus, the preferable temperatures of the cooking pan 2 and the object to be heated is maintained automatically by cooperative operation of the temperature sensor 5, the controller 12, the proportional electromagnetic valve 14 and so on. A gas cock 15 is for manually controlling the amount of the fuel gas to be supplied to the burner 4.

Further, if the temperature of the cooking pan 2 becomes overheated on account of a fire caused by, for example, an ignition of the cooking oil, the proportional electromagnetic valve 14 is closed by the controller 12 and the gas supplied to the burner 4 is stopped, thereby putting out the fire.

The detailed description of the temperature sensor 5 of the present invention follows.

Figure 7A:
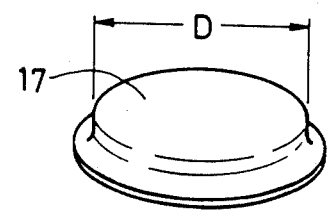
FIG. 7(a) is a perspective view of a dish type head of the temperature sensor of the present invention.
Figure 7B:
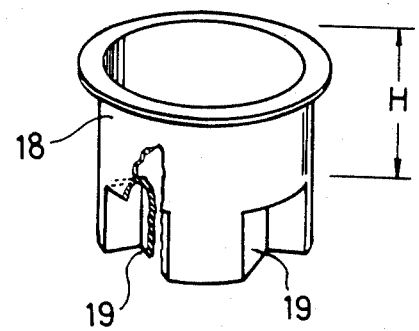
FIG. 7(b) is a partial cut perspective view of a pipe-shaped casing of the temperature sensor of the present invention.
Figure 7C:
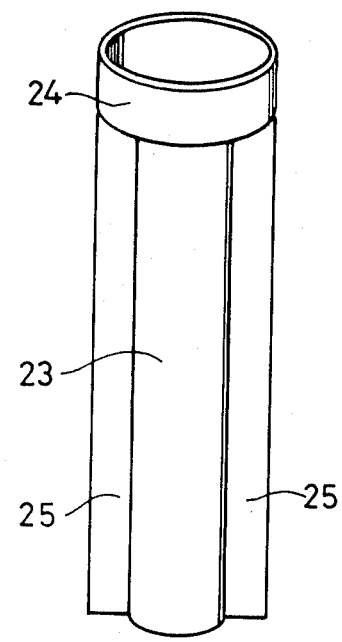
FIG. 7(c) is a perspective view of a supporting member of the temperature sensor of the present invention.

A thermo-sensitive member 16 has a pipe-shaped casing 18 and a dish type thermo-sensitive head 17 liquid-tightly covering the upper opening of the pipe type casing 18, thus forming an inverted cup-shaped casing. The pipe-shaped casing 18 has plural inner protrusions 19, 19 . . . at its lower part which are formed by press-working to project inwards of the pipe-shaped casing 18 at the lower part of the pipe-shaped casing 18 as shown in FIG. 7(b). In FIG. 4, on the bottom surface of the thermo-sensitive head 17, the temperature sensor 20 such as a thermistor is fixed. The temperature sensor 20 is connected to the lead wires 22 through the terminals 21.

As shown in FIGS. 4, 5, 6 and 7, a pipe-shaped, or cyclindrical supporting member 23 has, at its top part, a larger diameter part 24 which has a larger diameter than the main part. Further, the supporting member 23 has two long rib type protrusions 25 at its both sides. To the lower part of the supporting member 23, a holding member 26 is fixed by spot welding. The holding member 26 is fixed to the gas cooking stove casing 1 utilizing screws. A compression spring 27 is disposed between the larger diameter part 24 of the supporting member 23 and the thermo-sensitive head 17, and always bias the thermo-sensitive member 16 in an upwards direction. The pipe-shaped casing 18 covers the large diameter part 24 of the supporting member 23 with a small gap 28 formed between the inner surface of the pipe-shaped casing 18 and the outer surface of the large diameter part 24. Therefore, the thermo-sensitive member 16 can easily slide up and down. Furthermore, the pipe-shaped casing 18 can not slip out upward, since the movement along an upper direction of the inner protrusions 19 is stopped by the under surface of the large diameter part 24 of the supporting means 23. Further, the pipe-shaped casing 18 does not rotate largely since the rib type protrusions 25, 25 are captured between the inner protrusions 19, 19, 19, 19 as shown in FIG. 6(b), and therefore, undesirable strain and twisting stress to the lead wire 22 is avoided. Consequently a breaking of the wire by such force prevented.

Figure 6A:
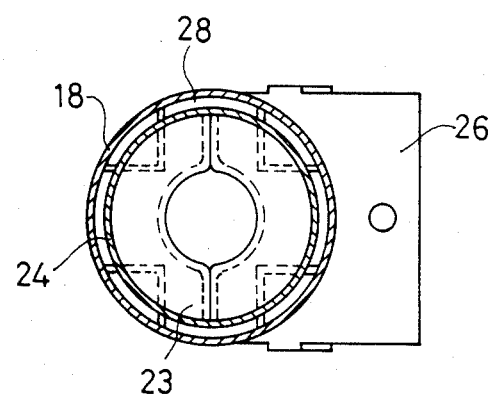
FIG. 6(a) is a horizontal sectional view along A—A line of FIG. 4.
Figure 6B:
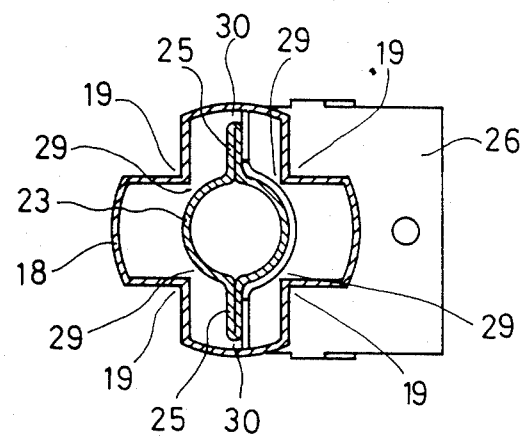
FIG. 6(b) is a horizontal sectional view along B—B line of FIG. 4.
Figure 6C:
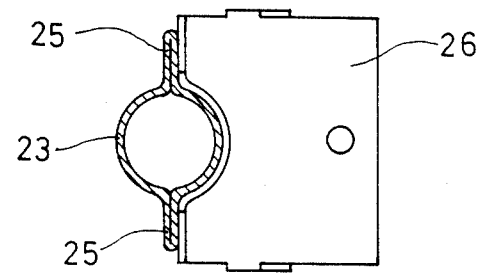
FIG. 6(c) is a horizontal sectional view along C—C line of FIG. 4.

As shown in FIGS. 6(a) and 6(b), small gap 28 between the pipe-shaped casing 18 and the large diameter part 24, the small gap 29 between the innermost part of the inner protrusion 19 and the outer surface of the main part of the supporting member 23, and the small gap 30 between the outermost part of the rib type protrusion 25 and the inner surface of the pipe-shaped casing 18, are provided to be almost equal with each other within 1 mm, and these gaps are for allowing smooth vertical motion of the thermo-sensitive member 16.

The height H between the upper surface of the dish type thermo-sensitive head 17 and the inner protrusions 19 is selected to be not more than the outer diameter D of the upper surface of the thermo-sensitive head 17. Thus, the contact of thermo-sensitive member 16 to the bottom of the pan 2 can be made stable against the lateral direction force induced from the bottom surface of the cooking pan 2. Therefore, even when the cooking pan 2 slides a lot in a lateral direction, the thermo-sensitive member 16 slips smoothly without a large inclination, thereby maintaining close contact between the bottom surface of the cooking pan 2 and the thermo-sensitive head 17. Accordingly, precise temperature sensing by the temperature sensor 5 can be made.

Since the temperature sensor 5 of the present invention is constituted as mentioned above, the temperature senso 5 has many advantages as follows.

Since, the pipe-shaped casing 18 covers the spring 27 and the large diameter part 24 of the supporting member 23, overflowed soup from the cooking pan 2 or dropping oil does not enter into the inner space of the temperature sensor 5. Further, the lowest end 18a of the pipe-shaped casing 18 is not bent in an inner direction but is shaped straight in a downward direction. Therefore, the overflowed soup or dropping oil which goes down along the outer surface of the pipe-shaped casing 18, drops straight downwards, and hence does not enter the inner space of the temperature sensor 5.

Accordingly, there is no fear that the overflowed soup or the dropping oil will make a hard lump in the temperature sensor 5, and thereby prevent the proper operation of the temperature sensor 5.

The thermo-sensitive member 16 can slide up and down with respect to the supporting member 23 in accordance with the force of the spring 27 and the putting of the bottom surface of the cooking pan 2 on the kettle holder 3, via the small gaps 28, 29 and 30.

Thus, even when the cooking pan 2 is disposed in an eccentric relation to the center of the kettle holder 3, the thermo-sensitive member 16 can flatly contact the bottom surface of the cooking pan 2 by a slight shifting forwards and backwards or in a right and left direction of the thermo-sensitive member 16 with respect to the supporting member 23 by utilizing the small gaps 28, 29 and 30 and by the upward force of the spring 27. Therefore, sensing of the temperature of the cooking pan 2 can be made accurately. That is, since the top part of the spring 27 directly pushes the under surface of the thermo-sensitive head 17, which is pushed on the bottom surface of the cooking pan 2, there is no possibility of producing a moment of force which can make the temperature sensor 5 incline and make the sensing of the temperature of the bottom surface of the cooking pan difficult. Furthermore, since the temperature sensor 5 has adequate gaps 28, 29 and 30 as mentioned above, the temperature sensor 5 can flatly contact the bottom of the pan 2 by slightly adjusting its angle in every direction. Therefore, even when the cooking pan 2 is disposed with inclination or the shape of the bottom surface of the cooking pan 2 is slightly sloping, the temperature sensor 5 can fit closely to the bottom surface of the cooking pan 2.

What is claimed is:

1. A spring-biased temperature sensor, comprising: a thermo-sensitive member, including:
   (a) means for sensing a temperature thereof; and
   (b) a first supporting structure for said sensing means having a substantially constant outer diameter D at a lowest portion thereof, said first supporting structure formed with a plurality of first inwardly facing protrusions at a lower inner part thereof;
   a second supporting structure having an upper portion which is within an inner portion of said first supporting structure, having a lower portion which has a smaller diameter than said upper portion thereof, and a transition structure connecting between said upper and lower portion, said transition structure having a top surface and a bottom surface, said second supporting structure formed with a plurality of second protrusions formed in said lower portion thereof, which mate with said first protrusions to prevent excessive rotation and twisting between said first and second supporting structures;
   wherein said inwardly facing protrusions have an upper surface defining escape preventing surface means for preventing said upper portion and said transition portion from leaving an area defined within said thermo-sensitive member by blocking further motion of said second supporting structure when contacting said bottom surface of said transition structure; and
   spring means for providing spring bias between said first and second supporting structures to bias said sensing means in an upward direction.

2. A temperature sensor is accordance with claim 1, wherein:
   a height between an upper surface of said thermo-sensitive member and said escape preventing surface means is not greater than said diameter D of said first supporting structure.

3. A sensor as in claim 1, wherein said upper portion of said second supporting structure has an outer diameter which is slightly smaller than an inner diameter of said first supporting structure, to thereby leave a small gap therebetween to allow a slight play between the two structures.

4. A spring-biased temperature sensor assembly, comprising:
   a supporting structure, having an upper portion of a first diameter, and a lower portion of a second dameter, smaller than said first diameter, said supporting structure including a plurality of protrusions formed thereon
   a casing, formed around said upper portion and at least part of said lower portion of said supporting structure, and formed with a plurality of inwardly projecting protrusions mating with said protrusions of said supporting structure to prevent relative twisting between said supporting structure and said casing and having upper surfaces which define escape prevention surface means for preventing said upper portion of said supporting structure from leaving an area defined within said casing by contacting an area of said supporting structure, said casing having an outer cross section of a substantially constant diameter;
   a temperature sensor holder, coupled to an upper portion of said casing;
   temperature sensing means, coupled to said temperature sensor holder, for sensing a temperature; and
   spring means for biasing between said casing and said supporting structure.

5. Apparatus as in claim 4, wherein said casing is shaped straight in a downward direction and has a lower-most portion thereof which has a constant diameter.

6. Apparatus as in claim 4, wherein said casing and said supporting structure are both substantially cylindrical and concentric.

7. An assembly as in claim 6, wherein said spring means biases against a spring biasing surface of said supporting structure and against an inner portion of said temperature sensor holder.

8. An assembly as in claim 4, used with a cooking device.

9. A spring-biased temperature sensor assembly, comprising:
   a sensor casing, having an outer surface that is substantially cylindrical with a diameter D, and an inner surface that has a plurality of inwardly facing protrusions at a lower portion thereof that do not extend outside said diameter D, said plurality of protrusions having upper surfaces which define first escape preventing surface means for preventing a supporting means within said casing from escaping therefrom, and having a bottom-most portion that is substantially of said diameter D;
   a temperature sensor assembly, coupled to an uppermost portion of said sensor casing;
   said supporting means for supporting said sensor casing and said temperature sensor assembly, including:
   (a) a lower portion having second protrusions formed thereon that mate with said inwardly facing protrusions of said sensor casing to allow linear displacement between said supporting means and said sensor casing but not allow twisting therebetween,
   (b) an upper portion of a larger diameter than a diameter of said lower portion and substantially concentric therewith, but of a smaller diameter than said diameter D, and of a height h, including stop surface means at an uppermost portion of said upper portion, for preventing said supporting means from getting closer to said temperature sensor assembly than a predetermined amount by contacting said temperature assembly at a first predetermined point in said linear displacement, said upper portion being entirely within an area defined by said sensor casing and said temperature sensor assembly,
   (c) a transition portion connecting said upper and lower portion and substantially perpendicular to both said upper and lower portions and including:
   (1) second escape preventing surface means for preventing said upper portion and said transition portion from leaving said area defined within said sensor casing and temperature assembly by contacting said first escape preventing surface means of said inwardly facing protrusions at a second predetermined point in said linear displacement and (2) spring bias surface means for accepting a spring bias; and spring means for imparting a spring bias between said temperature sensor assembly and said spring bias surface means to bias said supporting means into a lower-most position where said escape prevention surface means is biased against said inwardly facing protrusions.

* * * * *